United States Patent
Hebbalalu et al.

(10) Patent No.: US 12,141,613 B2
(45) Date of Patent: Nov. 12, 2024

(54) RESOURCE MANAGEMENT FOR PREFERRED APPLICATIONS

(71) Applicant: McAfee, LLC, San Jose, CA (US)

(72) Inventors: Raghavendra Satyanarayana Hebbalalu, Karnataka (IN); Raja Sinha, Bangalore (IN); Dattatraya Kulkarni, Bangalore (IN); Partha Sarathi Barik, Bangalore (IN); Srikanth Nalluri, Karnataka (IN); Siddaraya B. Revashetti, Cupertino, CA (US)

(73) Assignee: McAfee, LLC, San Jose, CA (US)

( * ) Notice: Subject to any disclaimer, the term of this patent is extended or adjusted under 35 U.S.C. 154(b) by 593 days.

(21) Appl. No.: 17/216,971

(22) Filed: Mar. 30, 2021

(65) Prior Publication Data

US 2022/0318057 A1 Oct. 6, 2022

(51) Int. Cl.
*G06F 9/50* (2006.01)
*G06F 11/34* (2006.01)

(52) U.S. Cl.
CPC .............. *G06F 9/5038* (2013.01); *G06F 9/50* (2013.01); *G06F 11/3438* (2013.01); *G06F 11/3442* (2013.01); *G06F 2209/501* (2013.01); *G06F 2209/5021* (2013.01); *G06F 2212/1016* (2013.01)

(58) Field of Classification Search
None
See application file for complete search history.

(56) References Cited

U.S. PATENT DOCUMENTS

| | | | |
|---|---|---|---|
| 6,059,842 A | 5/2000 | Dumarot et al. | |
| 7,340,774 B2 | 3/2008 | Hursey et al. | |
| 7,784,054 B2 | 8/2010 | Monasterio | |
| 9,081,623 B1 * | 7/2015 | Magerramov | G06F 9/5083 |
| 10,514,955 B2 * | 12/2019 | Wu | G06F 9/4887 |
| 2005/0141554 A1 * | 6/2005 | Hammarlund | G06F 9/5011 370/468 |
| 2012/0047509 A1 * | 2/2012 | Ben-Itzhak | G06F 9/50 718/103 |
| 2013/0254754 A1 | 9/2013 | Rajaraman | |

OTHER PUBLICATIONS

Linger et al., "Requirements Definition for Survivable Network Systems", 1998, IEEE, pp. 14-23. (Year: 1998).*

* cited by examiner

*Primary Examiner* — Qing Yuan Wu
(74) *Attorney, Agent, or Firm* — Patent Capital Group

(57) ABSTRACT

An apparatus, related devices and methods, having a memory element operable to store instructions; and a processor operable to execute the instructions, such that the apparatus is configured to monitor software and hardware parameters on an electronic device that includes an application designated as a preferred application; determine whether the preferred application is running; detect a change in software or hardware parameters that indicates to reallocate resources to the preferred application; and apply, based on detecting the change in software or hardware parameters, an optimization policy that reallocates resources to a process associated with the preferred application.

20 Claims, 8 Drawing Sheets

|  | Regular % Resource Utilization | Opimized % Resource Allocation | % Delta |
|---|---|---|---|
| Preferred Application | 20 | 40 | 20 |
| Other Applications | 30 | 25 | -5 |
| Non-Essential Processes | 20 | 15 | -5 |
| Background Services | 30 | 20 | -10 |

OPTIMIZATION ACTIONS 302

- INCREASE RESOURCE PRIORITY FOR A PREFERRED PROCESS
- DECREASE RESOURCE PRIORITY FOR A NON-ESSENTIAL PROCESS
- SUSPEND A NON-ESSENTIAL PROCESS
- TERMINATE A PROCESS OR AN APPLICATION
- REDUCE RAM RESOURCES FOR A NON-ESSENTIAL PROCESS
- TERMINATE UNNECESSARY SYSTEM SERVICES
- AFFINITIZE CORE FOR A PROCESS
- CHANGE SYSTEM POWER PLAN SETTINGS
- CHANGE OS SCHEDULING PARAMETERS TO FAVOR A BACKGROUND PROCESS
- CHANGE OS SCHEDULING PARAMETERS TO FAVOR A FOREGROUND PROCESS
- REDUCE NETWORK BANDWIDTH FOR A NON-ESSENTIAL APPLICATION
- PRIORITIZE NETWORK BANDWIDTH FOR PREFERRED APPLICATION

FIG. 3B

PERIODIC MONITORING 304

- SYSTEM LEVEL AND APPLICATION LEVEL FREQUENCY AND UTILIZATION FOR CPU
- SYSTEM LEVEL AND APPLICATION LEVEL FREQUENCY AND UTILIZATION FOR GPU
- SYSTEM LEVEL AND PER APPLICATION LEVEL RAM UTILIZATION
- SYSTEM LEVEL AND PER APPLICATION LEVEL I/O ACTIVITY
- SYSTEM LEVEL, PER APPLICATION LEVEL, AND PER PROCESS LEVEL NETWORK UTILIZATION
- CPU AND GPU TEMPERATURE
- POWER STATUS AND BATTERY LEVEL
- CURRENT WORKING SET OF APPLICATIONS
- SYSTEM RESPONSIVENESS
- PERIODIC PROCESS SNAPSHOT OF SYSTEM
- OS PARAMETERS
- SYSTEM CAPABILITY
- LOW CPU LEVEL COUNTERS

FIG. 3C

EVENT DETECTING 306

- CHANGE TO FOREGROUND PROCESS
- CHANGE TO BACKGROUND PROCESSES
- PROCESS CREATION
- PROCESS DELETION
- FILE OPENING
- FILE CLOSING

FIG. 3D

RESOURCE MANAGEMENT FOR PREFERRED APPLICATIONS

TECHNICAL FIELD

This disclosure relates in general to user space computing, more particularly, though not exclusively, to a system and method for providing resource management for preferred applications.

BACKGROUND

Users of modern computing devices increasingly demand a high degree of performance in processing tasks associated with applications, especially preferred applications, on their devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 3B is table identifying exemplary optimization actions, in accordance with an embodiment of the present disclosure.

FIG. 3C is table identifying exemplary periodic monitoring, in accordance with an embodiment of the present disclosure.

FIG. 3D is table identifying exemplary event detecting, in accordance with an embodiment of the present disclosure.

DETAILED DESCRIPTION

Figure 1:
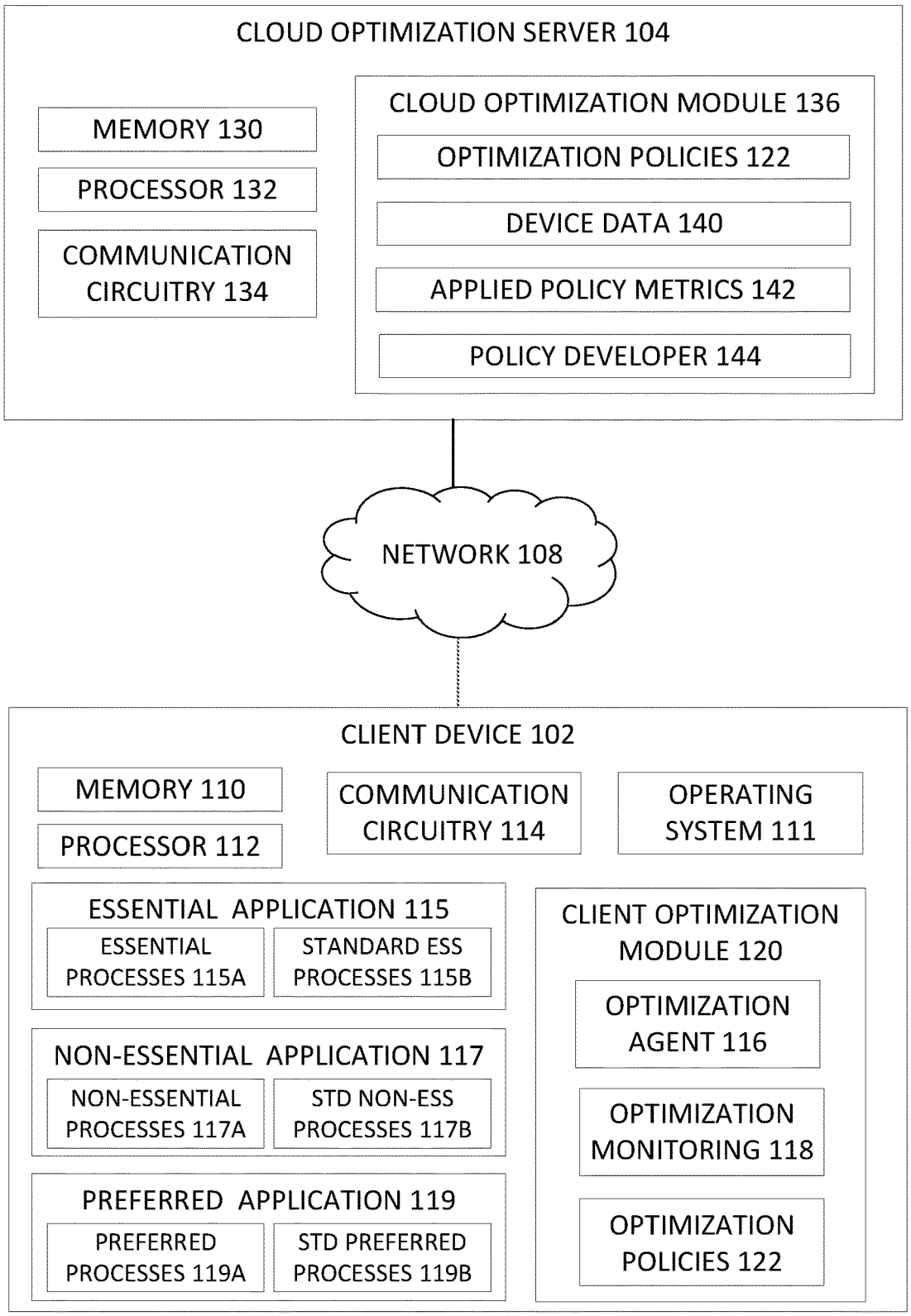
FIG. 1 is a simplified block diagram of an example system for automatically prioritizing resources to preferred applications and associated processes, in accordance with an embodiment of the present disclosure.

An apparatus, including systems and methods, for automatically prioritizing resources to preferred applications and associated processes is disclosed herein. For example, in some embodiments, an apparatus having a memory element operable to store instructions; and a processor operable to execute the instructions, such that the apparatus is configured to monitor software and hardware parameters on an electronic device that includes an application designated as a preferred application; determine whether the preferred application is running; detect a change in software or hardware parameters that indicates to reallocate resources to the preferred application; and apply, based on detecting the change in software or hardware parameters, an optimization policy that reallocates resources to a process associated with the preferred application. In another example, in some embodiments, an apparatus having a memory element operable to store instructions; and a processor operable to execute the instructions, is configured to designate a preferred application and a non-essential application; determine whether the preferred application is running; identify one or more process associated with the preferred application; determine whether resource usage levels of the one or more processes associated with the preferred application are being met; and reallocate, based on a determination that the resource usage levels are not being met, resources from the non-essential application to the one or more process associated with the preferred application.

Operating Systems (OS) allocate resources to ensure system responsiveness and performance for a user. However, the user can experience slowness with passing use due to limitations of the OS to reprioritize and reallocate resources. A user typically runs multiple applications during a computer session. When a user is running a high-demand application (e.g., a gaming application or a video-encoding application) or various applications on a computer that create high-demand workloads, the user may desire optimal performance of a select application (i.e., a preferred application). The user expects the preferred application to be assigned maximum priority by the OS and to be allocated maximum resources in order to achieve optimal preferred application performance. In some instances, the preferred application competes for resources with other non-essential software, including software that is known to slow computer performance, which may cause performance degradation. Examples of performance degradation may include a frozen display, delays in registering inputs, and slow response time in rendering images, among others. A user is likely to have little tolerance for slow performing applications.

Conventional systems are incapable of automatically identifying a preferred application and reallocating resources to the preferred application. A software application is distributed across multiple processes and generally includes foreground processes (e.g., user-interactive processing) and background processes (e.g., OS processing). The OS scheduling of resources is thread and process aware, but is unaware of application to process mapping. Traditionally, the OS addresses the application processes individually and does not addresses the processes collectively (i.e., at an application level), which can cause the OS to improperly assign resources and result in performance degradation. Also, since the OS functions at the processes level, the OS is unaware of the system resource consumption patterns of an application, such that the OS neither understands a priori nor learns subsequently about resource consumption by a specific application, which, If this is leveraged, could free up resources for other applications by assigning some application processes a higher priority and some application processes a lower priority. Further, the OS does not perform any application customization because there is no way to designate an application as "preferred" and assign more resources to it. Likewise, there is no way to designate an application as "non-preferred" or "non-essential" to allocate less resources to it so that resources are not being allocated to unnecessary processes, which results in sub-optimal usage of system capabilities and degrades the user experience. In some instances, the OS distinguishes between foreground processes and background processes, and assigns less priority and fewer resources to the background processes as compared to the foreground process. For example, in a gaming application or a video-encoding application, a significant portion of the workload processing is performed as a background process, and, if the OS does not prioritize and provide sufficient resources, the gaming application or video-encoding application may experience performance degradation. In some instances, the OS does not distinguish between foreground processes and background processes, and may assign equal priority and equal resources. When the OS assigns equal priority to processes and assigns the same opportunity to system resources, processes associated with preferred applications vie for the same resources as processes associated with non-preferred or non-essential applications. Although a user may manually increase priority of preferred applications prior to use, the OS does not automatically change priority levels of applications and does not recognize contextual importance of applications to the user. While the OS uses temporal and spatial locality to schedule inputs as users switch from application to application, the OS assigns system resource usage to the applications that are most relevant to the user. For example, if a user is switching between three different applications, the OS does not set a specific scheduling or performance policy that yields better end-user performance for those applications. In conventional systems, the OS scheduling decisions normally affect only one or two resources, for example, a central processing unit (CPU) and input/output (I/O) activity, in an individual process, and does not address the system holistically, for example, by affecting additional OS resources, including random access memory (RAM), and a graphics processing unit (GPU), among others. Further, all decisions for allocating resources undertaken by the OS, and even the hardware, are based on the historical data for a set of processes, which results in reactive rather than proactive resource allocation. A system and method for detecting user preferred applications and contextually reallocating resources from non-essential processes for improved user experience may be desired.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The meaning of "a," "an," and "the" include plural references. The meaning of "in" includes "in" and "on." When used to describe a range of dimensions, the phrase "between X and Y" represents a range that includes X and Y. For convenience, the phrase "FIG. 3" may be used to refer to the collection of drawings of FIGS. 3A-3D, etc. Although certain elements may be referred to in the singular herein, such elements may include multiple sub-elements. As used herein, the terms "software," "application," and "program" may be used interchangeably. As used herein, the terms "client" and "user" may be used interchangeably.

FIG. 1 is a simplified block diagram of an example resource optimization system for automatically prioritizing resources to preferred applications and associated processes, in accordance with an embodiment of the present disclosure. As illustrated in FIG. 1, an embodiment of the resource optimization system 100 may include a client device 102, a cloud optimization server 104, and network 108. The client device 102 may include memory 110, a processor 112, communication circuitry 114, an operating system 111, an essential application 115, a non-essential application 117, a preferred application 119, and a client optimization module 120. An essential application 115 is an application that is critical, required, or necessary for system operation. The essential application 115 may have processes 115A, 115B that have been mapped to and associated with the essential application 115. In some embodiments, only some processes associated with the essential application may be identified as essential processes 115A (e.g., resources allocated to essential processes 115A are prioritized) while other processes associated with the essential application may be designated as standard essential processes 115B (e.g., standard essential processes 115B are allocated the regular or normal amount of resources, and are not prioritized or deprioritized). In some embodiments, all processes associated with the essential application may be identified as essential processes 115A. A non-essential application 117 is an application that is not critical, not favored, or not frequently used by the client. The non-essential application 117 may have processes 117A, 117B that have been mapped to and associated with the non-essential application 117. In some embodiments, only some processes associated with the non-essential application may be identified as non-essential processes 117A (e.g., resources allocated to non-essential processes 117A are deprioritized) while other processes associated with the non-essential application may be designated as standard non-essential processes 117B (e.g., standard non-essential processes 117B are allocated the regular or normal amount of resources, and are not prioritized or deprioritized). In some embodiments, all processes associated with the non-essential application may be identified as non-essential processes 117A. A preferred application 119 is an application that is favored or frequently used by the client. The preferred application 119 may have processes 119A, 119B that have been mapped to and associated with the preferred application 119. In some embodiments, only some processes associated with the preferred application may be identified as preferred processes 119A (e.g., resources allocated to preferred processes 119A are prioritized) while other processes associated with the preferred application may be designated as standard preferred processes 119B (e.g., standard preferred processes 119B are allocated the regular or normal amount of resources, and are not prioritized or deprioritized). In some embodiments, all processes associated with the preferred application may be identified as preferred processes 119A. In some embodiments, the preferred application 119 may include any application or process that requires significant resources, such as a gaming software, an image and video editing software, data streaming software, and, in some instances, web-browsing software. In some embodiments, a plurality of preferred applications 119 may be further ranked to subcategorize the preferred applications 119 from highest priority to lowest priority, where resources are allocated to the highest ranked preferred application, and then to the next highest ranked preferred application, and so on. In some embodiments, the client device 102 may include other non-categorized applications and associated non-categorized processes (not shown), where resources may be reallocated from these non-categorized processes to preferred applications 119 and essential applications 115.

The client optimization module 120 may include an optimization agent 116, optimization monitoring 118, and optimization policies 122. The client optimization module 120 may be configured to implement optimization policies 122 developed for tuning computing system configurations for performance of the preferred application 119 by reallocating resources from the non-essential application 117. The client optimization module 120 may be configured to monitor system configurations, including the operating system 111, for detecting changes in system configurations and the operating system workload demands, and apply an optimization policy 122 to prioritize performance of the preferred application 119. For example, the optimization agent 116 may interface with the operating system 111 based on the optimization monitoring 118 indicating that operating system workload demands will be at or near capacity and that the preferred application 119 needs additional resources. The client optimization module 120 may apply, via the optimization agent 116, an optimization policy 122 to modify the operating system 111 to reallocate resources to the preferred application 119 (e.g., decrease or eliminate resources to non-essential processes 117A or allocate only normal resources to the standard processes 115B, 117B, 119B). The client optimization module 120 may communicate data (e.g., device data 140) associated with the implemented or applied optimization policy 122 to the cloud optimization server 104 for analysis and machine learning by the cloud optimization module 136.

The cloud optimization server 104 may include memory 130, a processor 132, communication circuitry 134, and a cloud optimization module 136. The cloud optimization module 136 may include optimization policies 122, device data 140, applied policy metrics 142, and a policy developer 144. The cloud optimization module 136 may be configured to develop optimization policies 122 for reallocating system resources for optimal performance of the preferred application 119 based on telemetry of device data 140 including device hardware and software configurations, and applied policy metrics 142. The client device 102 and cloud optimization server 104 may be in communication using network 108.

Figures 2, 3A:
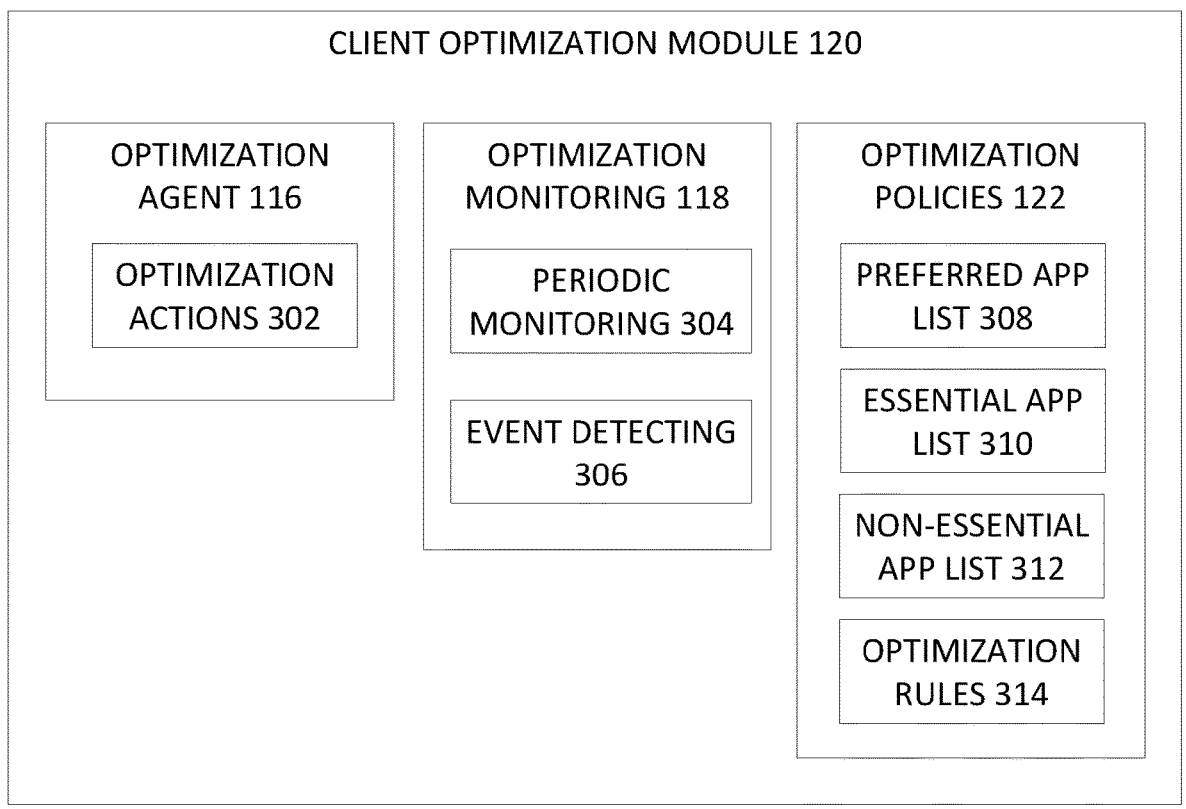
FIG. 2 is a table illustrating reallocation of resources to a preferred application, in accordance with an embodiment of the present disclosure.
FIG. 3A is a detailed block diagram of an example client optimization module 120 for automatically prioritizing resources to preferred applications and associated processes, in accordance with an embodiment of the present disclosure.

As shown in FIG. 1, the resource optimization system 100 enables applications on the client device 102 to be identified as a preferred application 119, a non-essential application 117, or an essential application 115. In some embodiments, the client optimization module 120 may identify the applications automatically. In some embodiments, the client may identify the applications manually. In some embodiments, the applications may be identified via a combination of manually by the client and automatically by the client optimization module 120. The processes associated with a particular application are mapped and assigned a categorization based at least in part on the utilization of the particular process or the designation of the associated application (e.g., preferred, non-essential, essential, or none). The client optimization module 120 may identify applications that are running, may identify resource usage of the applications via the resource usage of the associated processes, and may leverage existing OS calls to redirect resources from non-essential processes 117A to preferred applications 119 and essential applications 115. FIG. 2 is a table illustrating reallocation of resources to a preferred application, in accordance with an embodiment of the present disclosure. For example, as shown in FIG. 2, the client optimization module 120 may identify that a preferred application 119 requires twenty percent more resources to meet performance demands and may reallocate five percent of resources from other applications, five percent of resources from non-essential processes, and ten percent of resources from background services. Any number of resources may be reallocated from any number of categories, and the numbers and categories illustrated in FIG. 2 are simply exemplary. Although FIG. 2 uses resource percentages to illustrate an amount of resources that are reallocated to a preferred application, identifying actual resource consumption percentages may not be possible and instead a preferred application may be allocated all requested resources and those resources may be reallocated from other non-essential applications and processes without identifying actual resource percentages.

The client device 102 may be a network element and include, for example, desktop computers, laptop computers, mobile devices, personal digital assistants, smartphones, tablets, or other similar devices. The client device 102 also may be referred to herein as "user device" or "electronic device." The client device 102 may include one or more processors 112 for executing any type of instructions associated with the client device achieving the operations detailed herein. The processor 112 is connected to memory 110 and communication circuitry 114. The processor 112 may be based on one or more processors, microcontrollers, microprocessors, and programmable logic devices, among others. The memory 110 may store computer executable instructions or computer executable components as well as other data. The processor 112 executes computer executable instructions stored in memory 110. The memory 110 may store computer executable instructions and data used by the operating system 111, the essential application 115, the non-essential application 117, the preferred application 119, and/or the client optimization module 120. The communication circuitry 114 may be used to send and receive commands, requests, and other data to and from the client device 102.

The one or more processors 112 of the client device 102 may include, without limitation, a CPU, a GPU, a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, or combinations of hardware, and software and/or firmware, as appropriate.

Software or firmware implementations of the processors may include computer-executable or machine-executable instructions written in any suitable programming language to perform the various functions described. Hardware implementations of the processors may be configured to execute computer-executable or machine-executable instructions to perform the various functions described. The client device 102 may include a chipset (not shown) for controlling communications between one or more processors and one or more of the other components of the device. The processors 112 may also include one or more application specific integrated circuits (ASICs) or application specific standard products (ASSPs) for handling specific data processing functions or tasks.

The client device 102 may include one or more memory elements 110 for storing information and data. The one or more memory elements 110 may include one or more volatile and/or non-volatile memory devices such as, but not limited to, magnetic storage devices, read only memory (ROM), RAM, dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the device. The memory 110 may include one or more operating systems application software.

The client device 102 may include communication circuitry 114. The communication circuitry 114 of the client device 102 may be embodied as any communication circuitry, device, or collection thereof, capable of enabling communications between the client device 102 and other remote devices (e.g., the remote cloud optimization module 136). The terms "communication circuitry" and "I/O circuitry" may be used interchangeably herein. The communication circuitry 114 may be configured to use any one or more communication technology (e.g., wireless or wired communications) and associated protocols (e.g., Ethernet, Bluetooth®, Wi-Fi®, WiMAX, etc.) to effect such communication. The client device 102 may further include GPS and other location identifiers. The client device 102 may further include peripheral devices (not shown), which may include any number of additional peripheral or interface devices and associated I/O circuitry, such as speakers, microphones, additional storage devices, among others.

Cloud optimization server 104 may include memory 130, a processor 132, communication circuitry 134, and a cloud optimization module 136. The processor 132 is connected to memory 130 and communication circuitry 134. The processor 132 may be based on one or more processors, microcontrollers, microprocessors, and programmable logic devices, among others. Memory 130 may store computer executable instructions or computer executable components as well as other data. The processor 132 executes computer executable instructions stored in memory 130. The communication circuitry 134 may be used to send and receive commands, requests, and other data to and from the cloud optimization server 104. Client device 102 and cloud optimization server 104 may be in communication using network 108. The cloud optimization module 136 may receive, from the client optimization module 120, performance data associated with an applied optimization policy 122, may analyze the received data to identify opportunities to improve performance metrics, and may develop updated and/or new optimization policies 122 (e.g., by the policy developer 144). The cloud optimization module 136 may send to the client optimization module 120 an updated and/or new optimization policy 122 based on the results of the data analysis for the optimization agent 116 to implement.

Network 108 represents interconnected communication paths for receiving and transmitting packets of information that propagate through the resource optimization system 100. Network 108 may provide a communicative interface between devices and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 108 may include a network controller.

In resource optimization system 100, network traffic, which is inclusive of packets, frames, signals, and data, among others, may be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may be provided. Suitable interfaces and infrastructure may be provided to enable communication with the cellular network.

The term "packet" as used herein, refers to a unit of data that may be routed between networked devices or between a device and the cloud optimization server 104. A packet may include a source network address and a destination network address. These network addresses may be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, and/or data.

As used in any embodiment herein, the term "module" may refer to hardware, firmware, and/or circuitry configured to perform any of the aforementioned operations. A module also may include software. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms a part of one or more devices, as defined previously. The terms "module," "engine," and "administrator" may be used interchangeably herein.

FIG. 3A is a block diagram of a client optimization module 120 for automatically prioritizing resources to preferred applications and associated processes, in accordance with an embodiment of the present disclosure. An embodiment of the client optimization module 120 may include an optimization agent 116, optimization monitoring 118, and optimization policies 122. As shown in FIG. 3A, the client optimization module 120 may further include an optimization agent 116 configured to implement optimization policies 122 and interface with the OS to effect optimization actions 302. The optimization actions 302 may reallocate or may make more system resources available to a preferred application 119. FIG. 3B is table identifying exemplary optimization actions, in accordance with an embodiment of the present disclosure. FIG. 3B depicts exemplary optimization actions 302 that may be implemented via the OS and other software and hardware configurations, for example, increasing resource priority for a preferred process, decreasing resource priority for a non-essential process, suspending a non-essential process, terminating a process or an application, reducing RAM resources for a non-essential process, terminating unnecessary system services, affinitizing core for a process, changing system power plan settings, changing OS scheduling parameters to favor a background process, changing OS scheduling parameters to favor a foreground process, reducing network bandwidth for a non-essential application, and prioritizing network bandwidth for a preferred application, among others.

As shown in FIG. 3A, the client optimization module 120 may further include optimization monitoring 118 configured for periodically monitoring 304 and event detecting 306 of the client device 102. The optimization monitoring 118 may be a combination of hardware and software, for example, a low-level system software, such as a kernel driver, and a service component with designated privileges. The system hardware and software configurations may undergo periodic monitoring 304 and event detecting 306 to identify changes in system configurations that are likely to alter operating system workload demands. FIG. 3C is table identifying exemplary periodic monitoring, in accordance with an embodiment of the present disclosure. FIG. 3C depicts exemplary periodic monitoring 304 that may be performed, for example, system level and application level frequency and utilization for the CPU, system level and application level frequency and utilization for the GPU, system level and per application level RAM utilization, system level and per application level I/O activity, system level, per application level, and per process level network utilization, CPU and GPU temperatures, power status (e.g., whether on AC power or battery power) and battery level, current working set of applications, system responsiveness, periodic process snapshot of system, OS parameters, system capability, and low CPU level counters, among others. FIG. 3D is table identifying exemplary event detecting, in accordance with an embodiment of the present disclosure. FIG. 3D depicts exemplary event detecting 306 that may be performed, for example, change to current foreground process, change to current background processes, process creation, process deletion or termination, file opening, and file closing, among others.

As shown in FIG. 3A, the client optimization module 120 may further include optimization policies 122 that may include or may be based on a preferred application list 308, an essential application list 310, a non-essential application list 312, and optimization rules 314. As described below with reference to FIG. 4, the preferred application list 308, the essential application list 310, the non-essential application list 312, and optimization rules 314 as well as the optimization policies 122 may be generated by and received from the cloud optimization module 136 based on device data 140 received from one or more client devices 102. In some embodiments, the optimization rules 314 may be manually adjusted by a client. The optimization policies 122 may include rules or procedures (e.g., optimization rules 314) for how the optimization agent 116 is to configure software and hardware on a client device 102 for prioritizing system resources to the preferred application 119. For example, the optimization policies 122 may be configured to identify a preferred application 119. The optimization policies 122 may further be applied to prioritize system resources in accordance with the optimization rules 314 to the preferred application 119. In some embodiments, the optimization actions 302 for configuring software and hardware for prioritizing performance of the preferred application 119 may be included in one optimization policy 122. In some embodiments, the optimization actions 302 for configuring software and hardware for prioritizing performance of the preferred application 119 may be included in multiple optimization policies 122 that are applied in series or in unison. In some embodiments, the optimization actions 302 for prioritizing performance of the preferred application 119 may include only modifications to the software configuration on the client device 102. The preferred application list 308, the essential application list 310, and the non-essential application list 312 may further list one or more processes associated with the particular applications and designate as preferred, essential, or non-essential. The preferred application list 308 may be used to automatically designate applications included in the list as preferred applications 119 and may additionally include a preferred application 119 that was manually designated by the client. The essential application list 310 may be used to automatically designate applications included in the list as essential applications 115 and may additionally include an essential application 115 that was manually designated by the client. The non-essential application list 312 may be used to automatically designate applications included in the list as non-essential applications 117 and may additionally include a non-essential application 117 that was manually designated by the client. The optimization rules 314 may provide additional guidelines on how to apply optimization policies 122, for example, a maximum number of applications that may be prioritized at a time, a maximum amount of resources that may be reallocated, or an optimization action 302 that is prohibited under a specific system configuration. When periodic monitoring 304 or event detecting 306 indicate that system resources may need to be reallocated, the client optimization module 120 will apply an optimization policy 122 and effect optimization actions 302.

Figure 4:
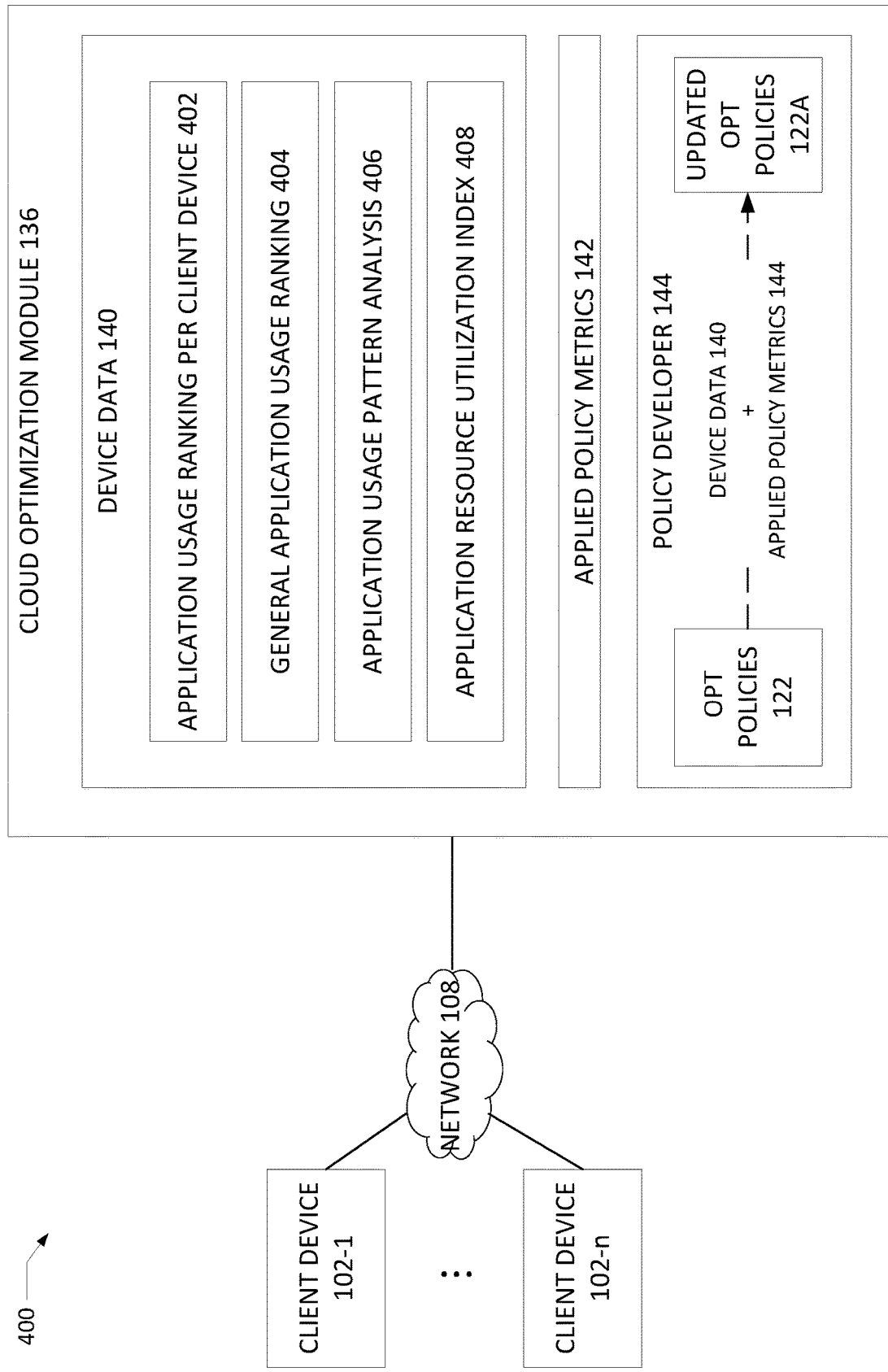
FIG. 4 is a simplified block diagram of a portion of a system 400 depicting for automatically prioritizing resources to preferred applications and associated processes, in accordance with an embodiment of the present disclosure.

FIG. 4 is a simplified block diagram of a portion of a resource optimization system 400 depicting, in more detail, a cloud optimization module 136 for automatically prioritizing resources to preferred applications and associated processes, in accordance with an embodiment of the present disclosure. The cloud optimization module 136 may include optimization policies 122, device data 140, applied policy metrics 142, and a policy developer 144. Although FIG. 4 depicts the optimization policies 122 as part of the policy developer 144, the optimization policies 122 may be separate, for example, as depicted in FIG. 1. The cloud optimization module 136 may receive from the client device 102 device data 140 of the software and hardware components of the client device 102 as well as software and hardware configurations and capabilities (e.g., including optimization monitoring 118, as described above with reference to FIG. 3A). The device data 140 may further include performance data that is collected during normal operation and/or during the implementation of an optimization policy 122 on the client device 102. The cloud optimization module 136 may store the device data 140 in memory 130 in the cloud optimization server 104, as shown in FIG. 1. In some embodiments, the device data 140 includes only data from a single client device 102-1 (e.g., the client device 102 of FIG. 1). In some embodiments, the device data 140 includes aggregated data from a plurality of client devices 102-n. In some embodiments, the device data 140 included from the plurality of client devices 102-n includes client devices that have similar software and hardware components as the client device 102, such that optimization policies 122 may be developed for client devices having specific software and hardware components. In some embodiments, the device data 140 included from the plurality of client devices 102-n includes client devices that have different software and hardware components than the client device 102, such that optimization policies may be developed to mitigate the differences in the software and hardware components and to learn application behavior across different software and hardware configurations. In some embodiments, the cloud optimization module 136 develops optimization policies 122 for specific software and hardware configurations. In some embodiments, the cloud optimization module 136 develops optimization policies for a variety of software and hardware configurations. In some embodiments, the cloud optimization module 136 determines the software and hardware configurations of a client device 102 and sends optimization policies 122 that most closely correspond to said configurations.

The device data 140 may include data generated from optimization monitoring 118 and derived data such as application usage ranking per client device 402, general application usage ranking 404, application usage pattern analysis 406, and application resource utilization index 408, among others. The application usage ranking per client device 402 is determined by combining a number of times an individual application was in the foreground of a client device 102 and a length of time (e.g., how long the application was in the foreground). The application usage ranking per client device 402 is an indicator of which application is a preferred application 119 by providing an estimate of how much an application is used by the client and how often. More active usage of an application indicates more client engagement and popularity. The application usage ranking per client device 402 may be used to generate the preferred application list 308 shown in FIG. 3A. The application usage ranking per client 402 may change dynamically as a client's usage patterns vary and the preferred application list 308 may be changed and updated accordingly. In some embodiments, an exponentially weighted moving average of the application usage ranking per client device 402 may be calculated to maintain an application's status as a preferred application 119. The general application usage ranking 404 is determined by combining the application usage ranking per client 402 across a plurality of client devices 102-n, for example, by calculating a weighted average, to identify and rank the most preferred applications. The general application usage ranking 404 may be used to further generate the preferred application list 308 shown in FIG. 3A. As the general application usage ranking 404 uses inputs from multiple client devices, a more robust preferred application list 308 may be generated. The application usage pattern analysis 406 establishes the overall use profile of an application by an individual client and by a plurality of clients. The application usage pattern analysis 406 determines usage of an application, including when, how often, and how long the application is used. The application usage pattern analysis 406 may further establish the overall usage of the individual processes associated with the application, including when, how often, and how long the individual processes associated with the application are used. The application resource utilization index 408 quantifies resource usage of an application by resource type and is defined as an n-tuple by the equation:

$$A = (R_1, R_2, R_3, R_4, \ldots R_n)$$

where n is a total number of resources (R) used by an application (A). A utilization ratio of a resource by the application is represented by $R_i$, where $R_i$ is a number between 0 and 1 (e.g., $0 \leq R_i \leq 1$). The resources may include the components of a system platform such as CPU, GPU, RAM, I/O, and network. The utilization ratio for each resource is calculated by the equation:

$$R_i = \frac{u_i * \text{avg\_capability\_level}_i}{\text{max\_capability\_level}_i}$$

where $u_i$ is the utilization of the individual resource. For an individual application, its CPU utilization index can be defined by the equation:

$$R_i = \frac{u * \text{avg\_frequency\_used}}{\text{max\_cpu\_frequency}}$$

The utilization $u$ in the above equation is a quantity that is periodically measured for an individual application and is available through the OS or via the hardware counters. The average frequency used is measured by the OS and/or the CPU counters. The maximum CPU frequency may be determined based on system capability. The average frequency used and maximum CPU frequency may be sent by a client device 102 as device data 140 to the cloud optimization module 140. Similar resource utilizations may be calculated for GPU, RAM, I/O, and network resources. With these quantifications, the application resource utilization index 408 may be quantified, for example, as n-tuple (0.123, 0.321, 0.089, 0.001, 0.02) where a numerical order is (CPU, GPU, RAM, Network, I/O). If the $R_i$ is based on a plurality of devices, the denominator will include the number of cores multiplied by the max_cpu_frequency for the individual processors. For example, if an application requires 20% at 2.4 gigahertz (GHz) one CPU and 30% at 2.5 GHz on a four core CPU at 3 GHz, the $R_i$ for that application will be equal to (0.2*2.4+0.3*2.5)/3.0*4 or about 10%. The application resource utilization index 408 may be calculated by the cloud optimization module 136 for a plurality of applications and recalculated periodically (e.g., based on a time period or on changes in resource utilization). The cloud optimization module 136 may use the application resource utilization index 408 as well as the application usage ranking per client device 402, the general application usage ranking 404, and the application usage pattern analysis 406 to develop optimization policies 122 to effect optimization actions 302 for prioritizing resources to a preferred application. For example, the application usage pattern analysis may identify that an application has a low usage rank and a high CPU utilization index, and an optimization policy 122 may be generated to lower the CPU priority of said application when in the background such that more resources may be made available for a foreground application. In another example, an optimization policy 122 may be generated to reallocate resources from non-essential applications or to stop or suspend unnecessary system services. In yet another example, the application usage pattern analysis may identify that the RAM utilization index for a preferred application is high, and an optimization policy 122 may be generated to automatically decrease RAM resources to processes that are not preferred and are not essential. The cloud optimization module 136 may send the application usage ranking per client device 402, the general application usage ranking 404, the application usage pattern analysis 406, and the application resource utilization index 408 in addition to the optimization policies 122 to client devices 102.

The cloud optimization module 136 may include applied policy metrics 142, which are predefined performance metrics developed to determine whether an applied optimization policy 122 is delivering the optimization as intended. The cloud optimization module 136 may receive device data 140 from the client device 102, including optimization monitoring 118 (e.g., periodically monitoring 304 and event detecting 306, as described above with reference to FIG. 3A). The cloud optimization module 136 may analyze and compare the received device data 140 to the applied policy metrics 142 to determine whether an optimization policy 122 is achieving the desired results. For example, the applied policy metrics 142 for a preferred application 119 may include a target that the GPU provide a minimum of 30 frames per second. The cloud optimization module 136 may determine from the device data 140 during the applied optimization policy 122 that the GPU provided 28 frames per second, such that the optimization policy 122 failed to meet the desired optimization results. In another example, the applied policy metrics 142 may include a target that the GPU provide a minimum of 30 frames per second. The cloud optimization module 136 may determine from the device data 140 during the applied optimization policy 122 that the GPU overheated and caused erratic frames per second (e.g., peaks and valleys of the frames per second above and below the targeted 30 frames per second). The policy developer 144 creates optimization policies 122 and develops updated optimization policies 122A based on the device data 140 and the applied policy metrics 142 to learn from the practical application of the optimization policies 122. The practical learning helps to improve the optimization policies 122 so that the desired results are achieved. For example, in the example of overheating the GPU, the updated optimization policy 122A may include only procedures for modifying software configurations to meet the desired results and not overclocking the GPU. The cloud optimization module 136 may deploy the updated optimization policy 122A to the optimization agent 116 on the client device 102 for implementation. The optimization policies 122 may be updated and improved over time based on additional device data 140 received from a plurality of client devices 102-*n*.

The cloud optimization module 136 may further use the device data 140 to create a system level profile for an individual application and develop optimization policies 122 that allocate appropriate usage levels across system components such as CPU, GPU, RAM, I/O, and network resources. The cloud optimization module 136 may develop a system level profile for each individual application and develop optimization policies 122 that allocate appropriate usage levels across the multiple applications and across system components to provide an improved client experience. The cloud optimization module 136 may further use the device data 140 to automatically learn about the resource consumption patterns of an application on a client device 102 as well as crowd source information about an application from a plurality of client devices 102-*n*. The cloud optimization module 136 may use the device data 140 to generate the preferred application list 308, the essential application list 310, and/or the non-essential application list 312, as described above with reference to FIG. 3A. The cloud optimization module 136 may automatically map applications to processes and may develop optimization policies 122 to prioritize resources to all processes associated with the application rather than only some of the processes associated with the application. The cloud optimization module 136 may further develop optimization policies 122 that automatically prioritize and de-prioritize system resource usage between a preferred application and an essential application to optimize performance of the preferred application and meet resource demands of the essential application. The cloud optimization module 136 may further develop optimization policies 122 that automatically prioritize and de-prioritize system resource usage between a preferred application and a non-essential application to optimize performance of the preferred application and the non-essential application. The cloud optimization module 136 may further develop optimization policies 122 to proactively allocate resources based on system monitoring of the client device (e.g., optimization monitoring 118, including periodically monitoring 304 and event detecting 306, as described above with reference to FIG. 3A).

Figure 5:
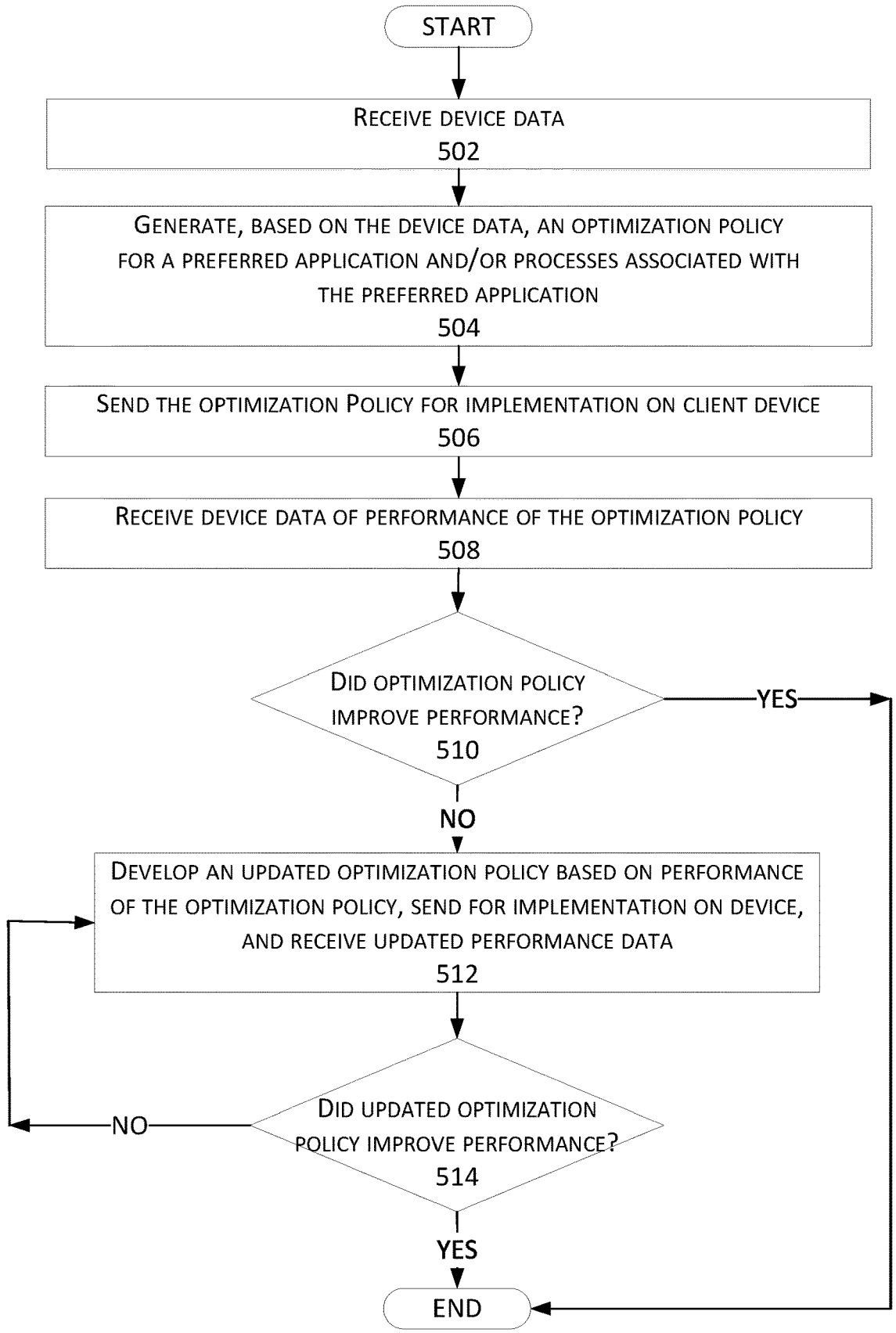
FIG. 5 is a simplified flowchart illustrating potential operations that may be associated with developing new and updated optimization policies, in accordance with an embodiment of the present disclosure.

FIG. 5 is a simplified flowchart illustrating potential operations that may be associated with developing new and updated policies for tuning a computing system for performance of a preferred application, in accordance with an embodiment of the present disclosure. The one or more operations may be performed by the cloud optimization module 136. At 502, device data is received. The device data may include monitoring data (e.g., the optimization monitoring 118), software and the hardware configurations, and system capabilities of the client device and, in some embodiments, device data may include device data of other client devices. For example, the device data may include the preferred applications, the essential applications, the number and types of CPUs, the number and types of GPUs, the number and types of memory elements, the types of hardware sensors, and the software applications installed on the device. At 504, an optimization policy is developed based on the device data to improve performance of a preferred application and/or processes associate with the preferred application. At 506, the optimization policy is sent to the client device for implementation. For example, the device may implement the optimization policy as described above with reference to FIGS. 3 and 4. At 508, performance data during implementation of the optimization policy is received. At 510, based on the performance data, a determination is made as to whether the optimization policy improved performance of the preferred application. For example, the performance data may be analyzed and compared to applied policy metrics, as described above with reference to FIG. 4, to determine whether the optimization policy met the desired performance expectations. If the optimization policy improved the performance of the preferred application, then the process ends. If the optimization policy did not improve the performance as desired, then the process proceeds to 512. At 512, an updated optimization policy is developed based on the updated device data, the updated optimization policy is sent to the client device for implementation, and performance data during implementation of the updated optimization policy is received. In some embodiments, the updated optimization policy may be developed based on aggregated data that includes performance data received from other devices. At 514, based on the updated performance data, a determination is made as to whether the updated optimization policy improved performance. If the updated optimization policy improved the performance of the device as desired, then the process ends. If the updated optimization policy did not improve the performance of the device as desired, then the process proceeds back to 512 and the operations at 512 and 514 may be repeated until an updated optimization policy that improves performance as expected is developed.

Figure 6A:
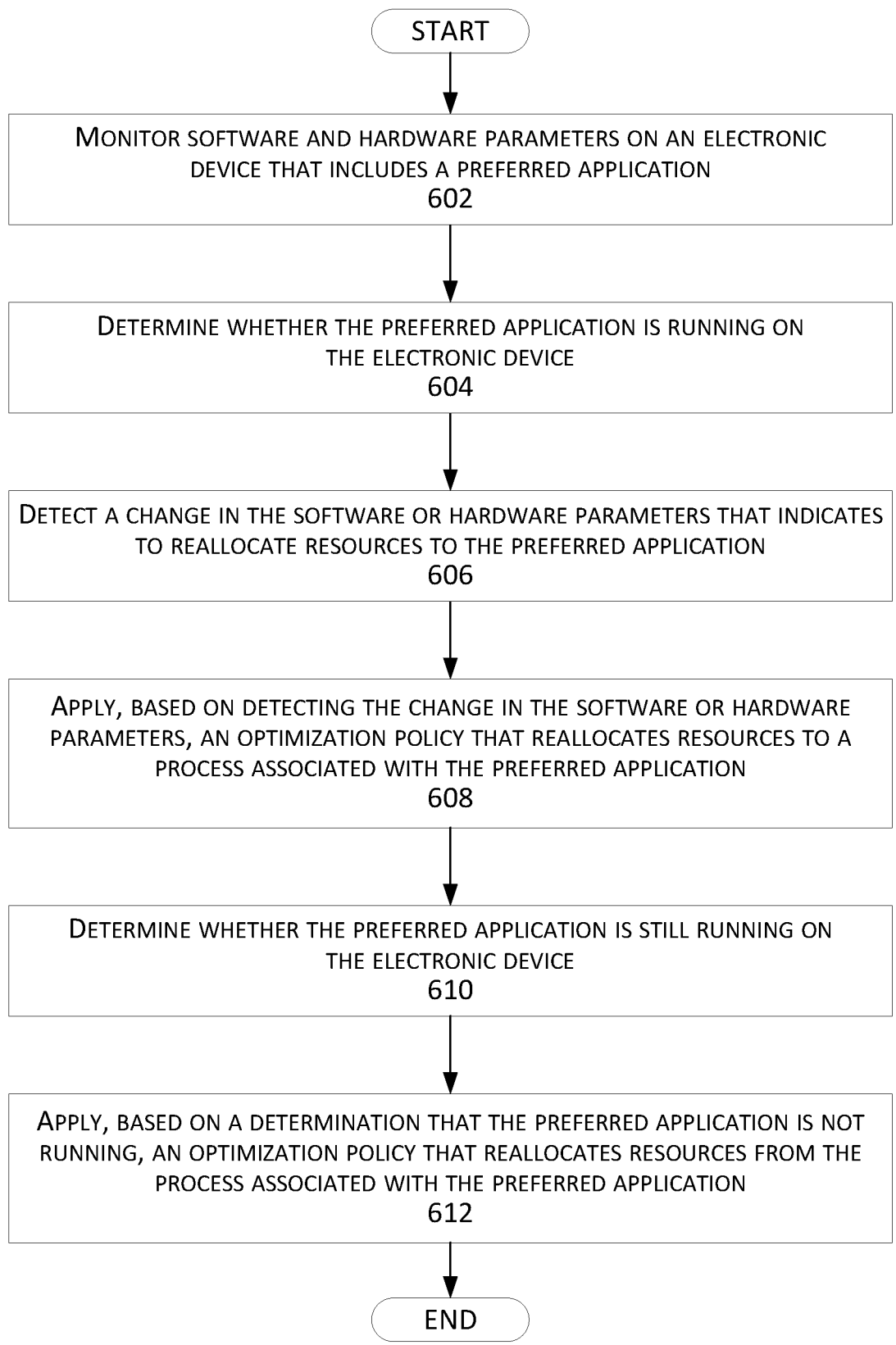
FIG. 6A is a simplified flowchart illustrating potential operations that may be associated with tuning a computing system for performance of a preferred application, in accordance with an embodiment of the present disclosure.

FIG. 6A is a simplified flowchart illustrating potential operations that may be associated with tuning a computing system for performance of a preferred application, in accordance with an embodiment of the present disclosure. The one or more operations may be performed by the optimization agent 116, by the client optimization module 120, or by a combination of the optimization agent 116 and the client optimization module 120. At 602, software and hardware parameters are monitored on an electronic device that includes an application designated as a preferred application. For example, as described above with reference to FIG. 3, an application on the electronic device is identified as a preferred application 119 either automatically via a preferred application list 308 or manually by the client. Software parameters, including OS parameters, and hardware parameters on the electronic device are monitored to detect changes that indicate to reallocate resources to the preferred application (e.g., the periodic monitoring or the event detecting triggers a reallocation of resources to or from a preferred application). At 604, a determination of whether a preferred application is running on an electronic device is made. For example, periodic monitoring may be performed to identify a current working set of applications and the client optimization module 120 may determine whether the current working set of applications includes an application that has been designated as a preferred application (e.g., whether the application is included on the preferred application list). At 606, the monitored parameters are analyzed to detect a change in the parameters that indicates to reallocate resources to the preferred application. For example, the operating system may be monitored periodically to determine the amount of system resources being used for a CPU and whether the preferred application needs additional CPU resources. In another example, the software may be monitored to detect an event such as a file opening and whether the opened file is taking or will take resources from the preferred application. At 608, based on detecting the change in parameters, an optimization policy is applied to reallocate resources to a process associated with the preferred application. For example, if a change in foreground application is detected (e.g., a change in Windows hook or an OS event tracing mechanism, such as Event Tracing for Windows (ETW)), an optimization policy may be applied to prioritize I/O and CPU resources (e.g., allocate additional I/O and CPU resources) to one or more processes associated with the foreground application. At 610, a determination is made as to whether the preferred application is still running on the electronic device (e.g., by periodic monitoring of current working set of applications or event detection of the preferred application closing). At 612, based on a determination that the preferred application is not running, the applied optimization policy is removed or another optimization policy is applied to reallocate resources from the process associated with the preferred application. After 612, the process ends.

Figure 6B:
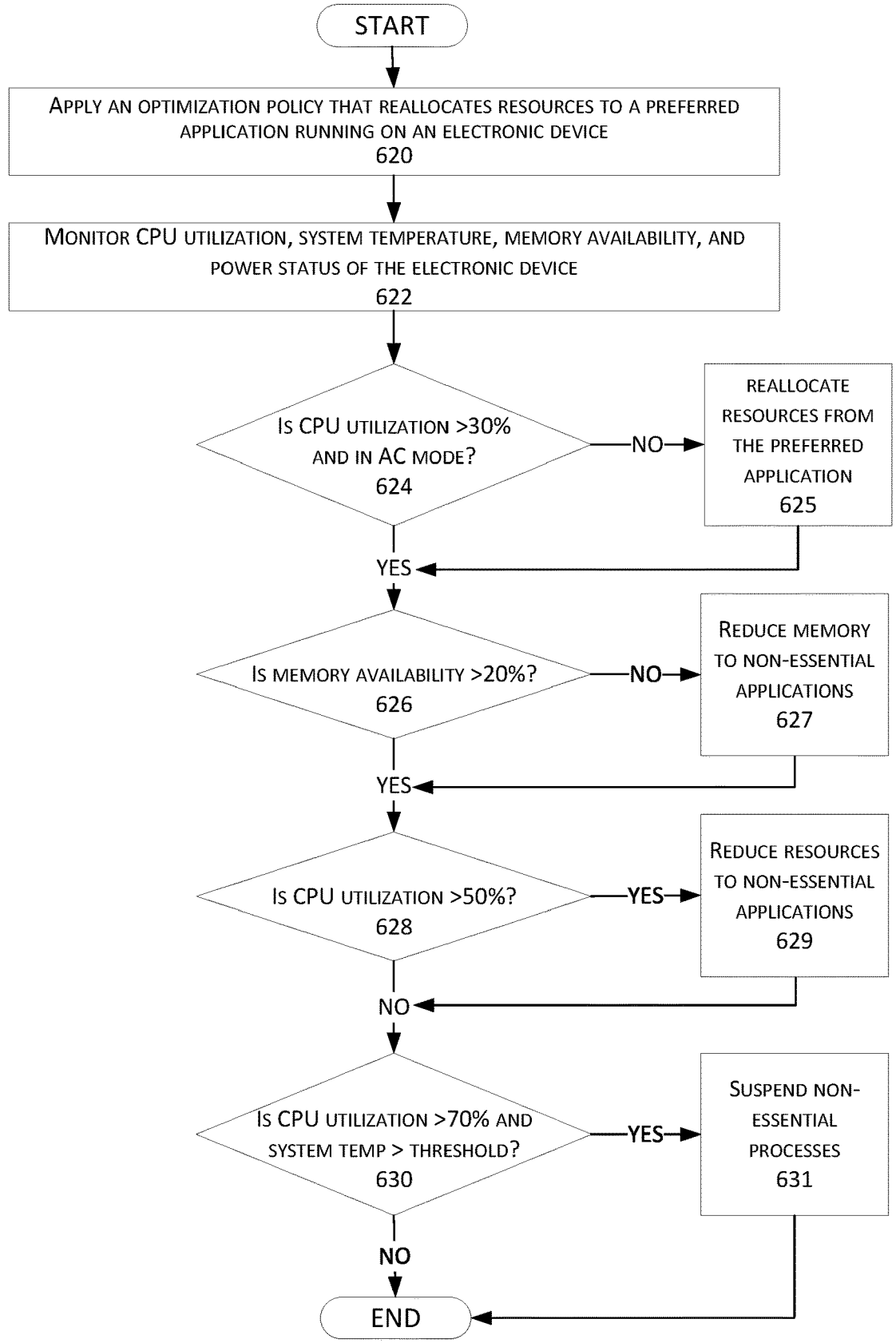
FIG. 6B is a simplified flowchart illustrating additional exemplary operations that may be associated with tuning a computing system for performance of a preferred application, in accordance with an embodiment of the present disclosure.

FIG. 6B is a simplified flowchart illustrating additional exemplary operations that may be associated with tuning a computing system for performance of a preferred application, in accordance with an embodiment of the present disclosure. At 620, an optimization policy that reallocates resources to a preferred application running on an electronic device is applied. At 622, software and hardware parameters, specifically, CPU utilization, system temperature, memory availability, and power status (i.e., in AC mode/plugged in or on battery power), are monitored on an electronic device that includes an application designated as a preferred application. At 624, a determination is made as to whether the CPU utilization is greater than 30% and whether the electronic device is in AC mode. If the CPU utilization is, for example, greater than 30% and the electronic device is in AC mode, the process continues to 626. If the CPU utilization is not greater than 30% or if the electronic device is on battery power, the process proceeds to 625. The CPU utilization value as well as other utilization values in FIG. 6 are simply example values, which may be determined by the optimization policy and may vary depending on the preferred applications running and client device configurations. At 625, resources that were allocated to the preferred application under the optimization policy are removed and returned to the OS for allocation to other essential, or higher ranked preferred, applications and processes. In some embodiments, the resources are removed from the preferred application by removing the applied optimization policy. In some embodiments, the resources are removed from the preferred application by applying another optimization policy. After 625, the process continues to 626. At 626, a determination is made as to whether the memory availability is greater than 20%. If the memory availability is greater than 20%, the process continues to 628. If the memory availability is not greater than 20%, the process continues to 627. At 627, memory availability is reduced to non-essential applications and processes. After 627, the process continues to 628. At 628, a determination is made as to whether the CPU utilization is greater than 50%. If the CPU utilization is not greater than 50%, the process continues to 630. If the CPU utilization is greater than 50%, the process proceeds to 629. At 629, CPU resources are reduced to non-essential applications and processes. After 629, the process continues to 630. At 630, a determination is made as to whether the CPU utilization is greater than 70% and whether a system temperature is above a threshold value. If the CPU utilization is not greater than 70% and the system temperature is not above the threshold value, the process ends. If the CPU utilization is greater than 70% and the system temperature is greater than the threshold value, the process proceeds to 631. At 631, CPU resources to non-essential applications and processes are suspended. After 631, the process ends. In some embodiments, the process returns to 622 to continually monitor software and hardware parameters.

Figure 7:
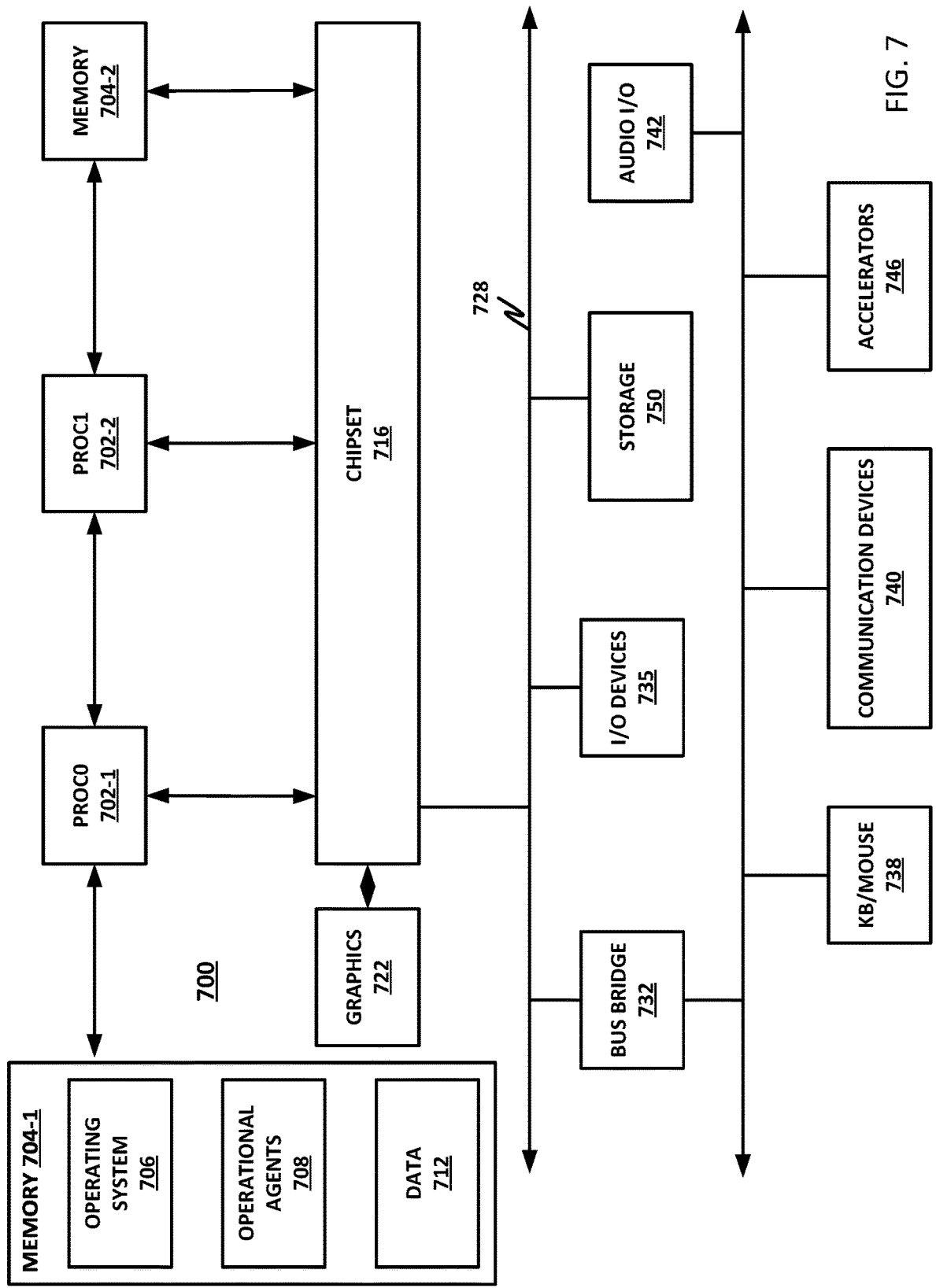
FIG. 7 is a block diagram of selected elements of a hardware platform.

FIG. 7 is a block diagram of a hardware platform 700. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an operating system 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high-performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more CPUs.

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with processor 702 via a bus. For example, some memories may be connected via a system bus, or in a data center, memory may be accessible in a remote DMA (RDMA) configuration.

Memory 704 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a Unix/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own GPU.

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various USB, FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more non-transitory computer-readable mediums having stored thereon executable instructions operable to instruct a processor to provide operational functions. At an appropriate time, such as upon booting hardware platform 700 or upon a command from operating system 706 or a user or security administrator, processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a non-volatile memory. Thus, for example, an "engine" as described above could include instructions stored within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and non-limiting example, a magnetic media (e.g., hard drive), a flash memory, a read-only memory (ROM), optical media (e.g., CD, DVD, Blu-Ray), non-volatile random access memory (NVRAM), non-volatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a non-limiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

The invention claimed is:

1. An apparatus, comprising:
a memory element operable to store instructions; and
a processor operable to execute the instructions, such that the apparatus is configured to:
monitor software and hardware parameters on an electronic device that includes an application designated as a preferred application;
determine whether the preferred application is running;
detect a change in software or hardware parameters that indicates to reallocate resources to the preferred application;
apply, based on detecting the change in software or hardware parameters, an optimization policy that reallocates resources to one or more processes associated with the preferred application from a non-essential application, wherein at least one of the one or more processes is a background process that includes video encoding, wherein the optimization policy includes optimization rules on how to apply the optimization policy, wherein a first optimization rules includes a maximum allowed number of applications that can be designated as preferred applications with allocated resources being prioritized and a second optimization rule includes whether or not a specific optimization action is prohibited under a specific electronic device configuration;
receive performance data related to the preferred application, wherein the performance data is collected after implementation of the optimization policy; and
apply, based on a determination that the optimization policy did not improve performance of the preferred application, an updated optimization policy, wherein the updated optimization policy is developed based on the performance data.

2. The apparatus of claim 1, wherein the optimization policy is a first optimization policy, and the apparatus is further configured to:
determine, based on detecting the change in software or hardware parameters, that the preferred application is not running; and
apply, based on a determination that the preferred application is not running, a second optimization policy that reallocates resources from the preferred application.

3. The apparatus of claim 1, further configured to:
send, to a cloud server, monitoring data associated with the software and hardware parameters.

4. The apparatus of claim 1, wherein the monitored software and hardware parameters include one or more of central processing unit (CPU) utilization, graphics processing unit (GPU) utilization, random access memory (RAM) utilization, input/output (I/O) activity, CPU temperature, and GPU temperature.

5. The apparatus of claim 1, wherein detecting the change in software or hardware parameters that indicates to reallocate resources to the preferred application includes change to a foreground process, change to a background process, a process creation, a process deletion, a file opening, and a file closing.

6. The apparatus of claim 1, wherein reallocating resources to a process associated with the preferred application includes prioritizing CPU resources to the process associated with the preferred application, prioritizing network bandwidth to the process associated with the preferred application, terminating a process not associated with the preferred application, or terminating an application that is not the preferred application.

7. The apparatus of claim 1, wherein a third optimization rule includes a maximum amount of resources that may be reallocated.

8. The apparatus of claim 7, wherein the application is designated as the preferred application by a user of the electronic device and the optimization rules can be manually adjusted by the user.

9. At least one non-transitory computer-readable medium comprising one or more instructions that when executed by a processor, cause the processor to:
designate, on an electronic device including a plurality of applications, a first application as a preferred application and a second application as a non-essential application;
determine whether the preferred application is running;
identify one or more processes associated with the preferred application;
apply an optimization policy that reallocates resources to the one or more processes associated with the preferred application from the non-essential application, wherein the optimization policy includes optimization rules on how to apply the optimization policy, wherein a first optimization rules includes a maximum allowed number of applications that can be designated as preferred applications with allocated resources being prioritized and a second optimization rule includes whether or not a specific optimization action is prohibited under a specific electronic device configuration;
determine whether resource usage levels of the one or more processes associated with the preferred application are being met; and
reallocate, based on a determination that the resource usage levels are not being met, resources from the non-essential application to the one or more processes associated with the preferred application from the non-essential application, wherein at least one of the one or more processes is a background process that includes video encoding;
re-determine whether required resource usage levels of the one or more processes associated with the preferred application are being met; and
until it is determined that the resource usage levels of the one or more processes associated with the preferred application are being met, continue to reallocate resources from the non-essential application to the one or more process associated with the preferred application and re-determine whether resource usage levels of the one or more processes associated with the preferred application are being met.

10. The at least one non-transitory computer-readable medium of claim 9, further comprising one or more instructions that when executed by the processor, cause the processor to:

determine that the preferred application is no longer running; and reallocate, based on a determination that the preferred application is not running, resources from the preferred application to the non-essential application.

11. The at least one non-transitory computer-readable medium of claim 9, further comprising one or more instructions that when executed by the processor, cause the processor to:

wherein reallocating resources to the one or more processes associated with the preferred application includes prioritizing CPU resources to the one or more processes associated with the preferred application, prioritizing network bandwidth to the one or more processes associated with the preferred application, suspending the non-essential application, terminating the non-essential application, or terminating a process associated with the non-essential application.

12. The at least one non-transitory computer-readable medium of claim 9, further comprising one or more instructions that when executed by the processor, cause the processor to:

monitor software and hardware parameters on the electronic device, wherein the monitored software and hardware parameters include one or more of central processing unit (CPU) utilization, graphics processing unit (GPU) utilization, random access memory (RAM) utilization, input/output (I/O) activity, CPU temperature, and GPU temperature.

13. The at least one non-transitory computer-readable medium of claim 12, further comprising one or more instructions that when executed by the processor, cause the processor to:

detect a change in the software or hardware parameters that indicates to reallocate resources to the preferred application, wherein detecting the change in software or hardware parameters that indicates to reallocate resources to the preferred application includes change to a foreground process, change to a background process, a process creation, a process deletion, a file opening, and a file closing.

14. The at least one non-transitory computer-readable medium of claim 12, further comprising one or more instructions that when executed by the processor, cause the processor to:

send, to a cloud server, monitoring data associated with the software and hardware parameters.

15. The at least one non-transitory computer-readable medium of claim 9, further comprising one or more instructions that when executed by the processor, cause the processor to:

designate, on the electronic device, a third application as an essential application.

16. The at least one non-transitory computer-readable medium of claim 15, further comprising one or more instructions that when executed by the processor, cause the processor to:

determine whether resource usage levels of the essential application are being met; and reallocate, based on a determination that the resource usage levels of the essential application are not being met, resources from the non-essential application or from the one or more processes associated with the preferred application to the essential application.

17. A method, comprising:

receiving, from an electronic device having a plurality of applications, device data that includes software parameters, hardware parameters, and usage data of individual applications of the plurality of applications;

identifying, based on the device data, a preferred application of the plurality of applications;

developing, based on the device data, an optimization policy to improve performance of the preferred application, wherein the optimization policy includes optimization rules on how to apply the optimization policy, wherein a first optimization rules includes a maximum allowed number of applications that can be designated as preferred applications with allocated resources being prioritized and a second optimization rule includes whether or not a specific optimization action is prohibited under a specific electronic device configuration;

sending the optimization policy to the electronic device for implementation;

receiving, from the electronic device, performance data of the preferred application collected during implementation of the optimization policy;

determining whether the optimization policy improved performance of the preferred application; and developing, based on a determination that the optimization policy did not improve performance of the preferred application, an updated optimization policy, wherein the updated optimization policy is developed based on the performance data and includes reallocating resources to one or more processes associated with the preferred application from a non-essential application, wherein at least one of the one or more processes is a background process that includes video encoding.

18. The method of claim 17, wherein determining whether the optimization policy improved performance of the preferred application includes comparing the performance data to predefined performance metrics.

19. The method of claim 17, wherein the electronic device is a first electronic device, and the preferred application is a first preferred application, and the method further comprising:

receiving, from a second electronic device having a plurality of applications, device data that includes software parameters, hardware parameters, and usage data of individual applications of the plurality of applications;

identifying, based on the device data received from the second electronic device, a second preferred application of the plurality of applications;

sending the optimization policy to the second electronic device for implementation;

receiving, from the second electronic device, performance data of the second preferred application collected during implementation of the optimization policy;

determining whether the optimization policy improved performance of the second preferred application; and developing, based on a determination that the optimization policy did not improve performance of the second preferred application, the updated optimization policy based on the performance data from the first and second electronic devices.

20. The method of claim 17, further comprising:

mapping a process associated with the preferred application and identifying the process as a preferred process.

* * * * *